March 31, 1942.  L. H. DONNELL  2,278,194
MEASURING INSTRUMENT
Filed Nov. 4, 1940  3 Sheets-Sheet 3
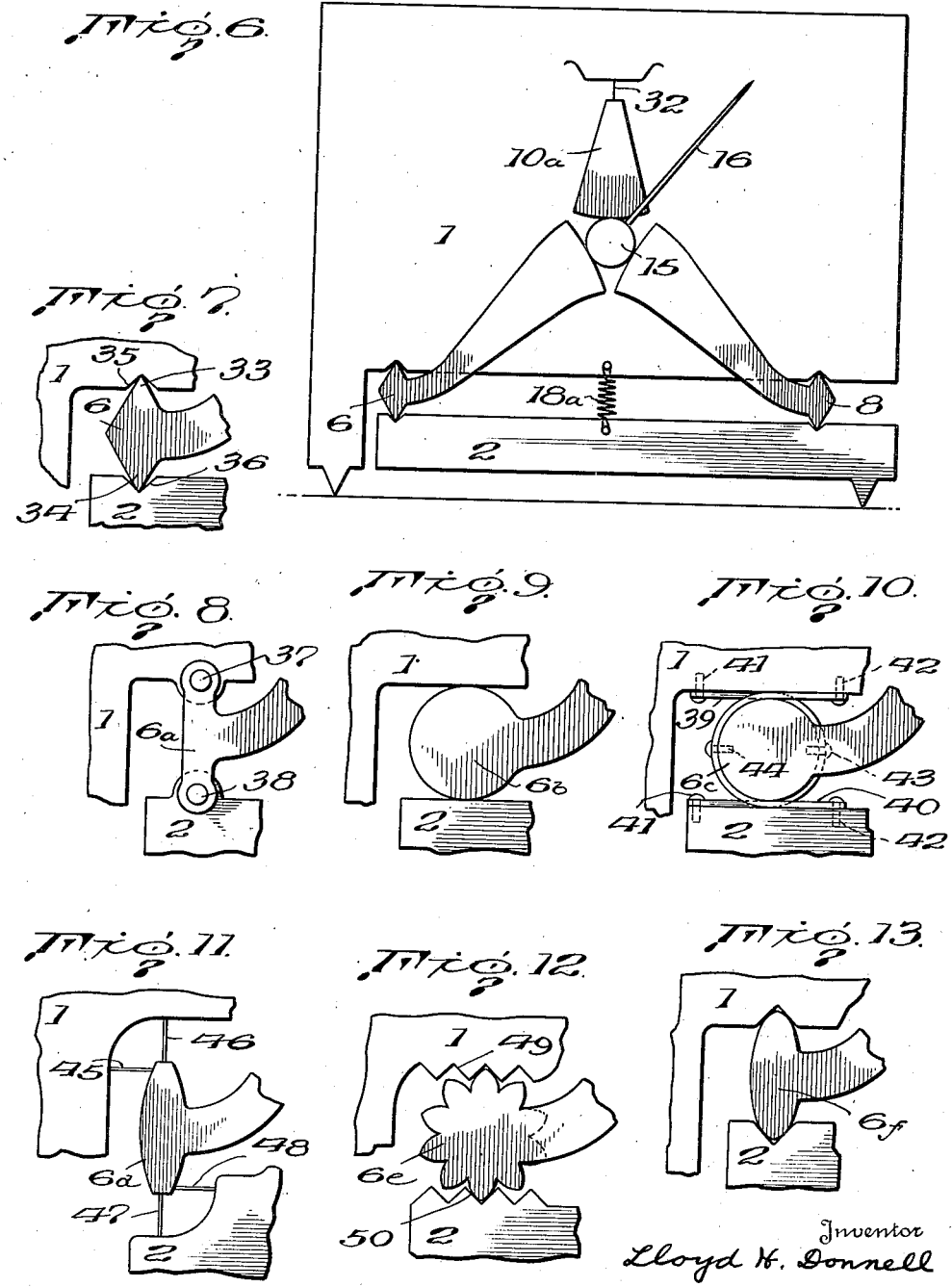
Inventor
Lloyd H. Donnell
By Leech & Radue
Attorneys Patented Mar. 31, 1942

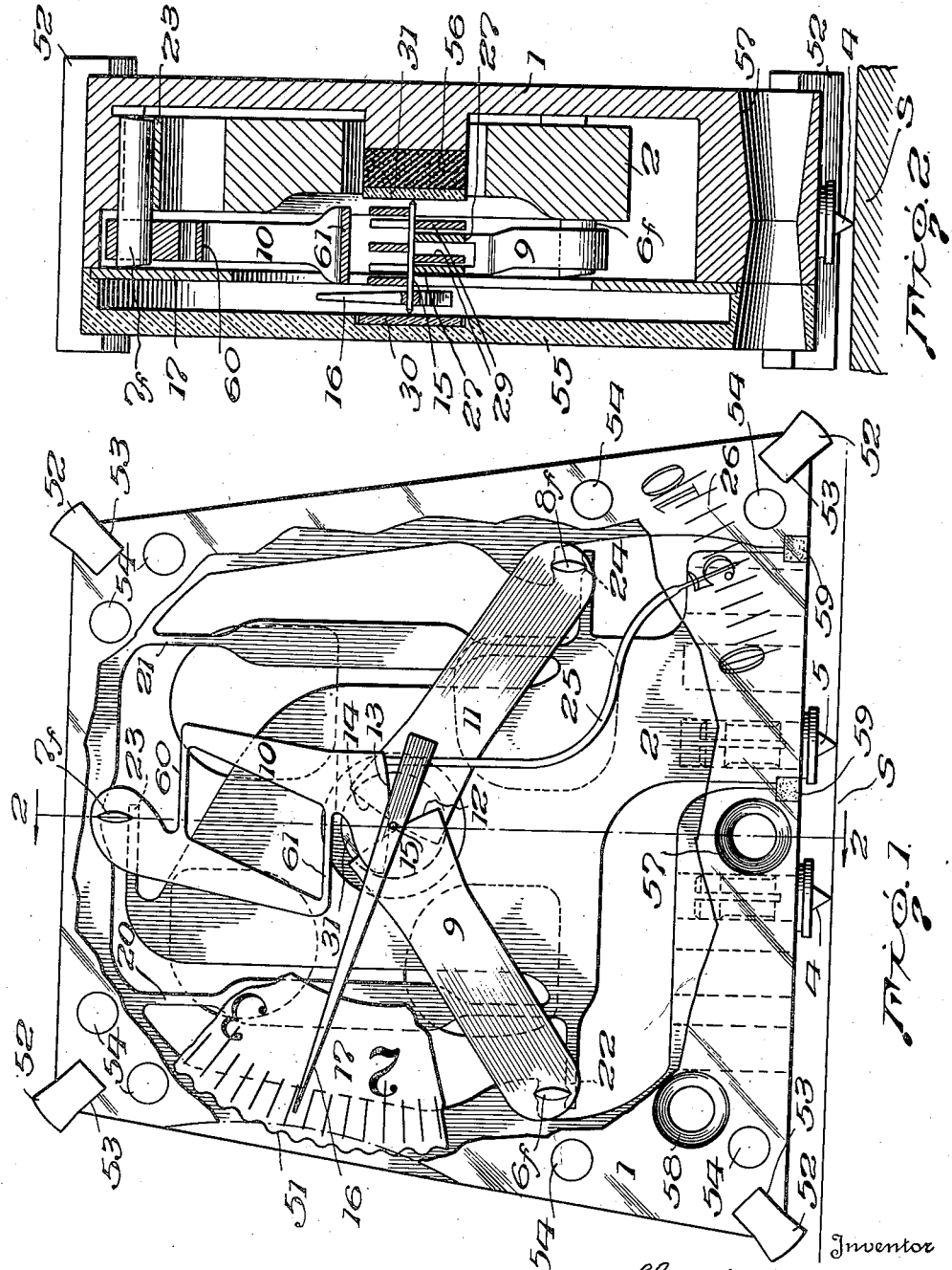

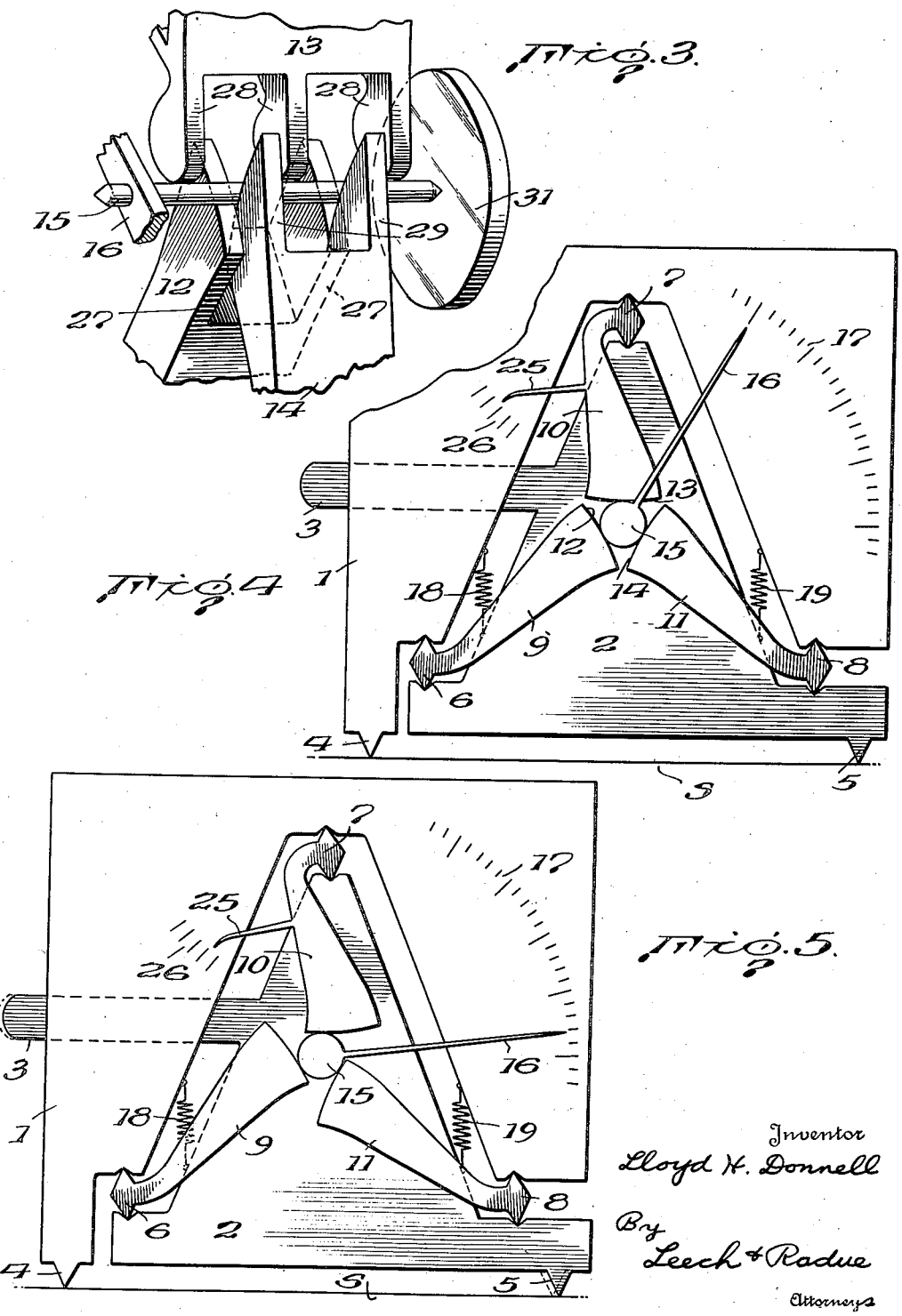

2,278,194

UNITED STATES PATENT OFFICE 2,278,194

MEASURING INSTRUMENT

Lloyd H. Donnell, Chicago, Ill.

Application November 4, 1940, Serial No. 364,316

18 Claims. (Cl. 33—147)

This invention relates to instruments for measuring small distances, movements or strains, and in particular to the type of devices known as extensometers and "dial gages."

Generally speaking, the purpose which the present invention attains is the provision of an improved form of extensometer which is reliable and less costly than those now available.

The primary object of this invention is to provide an accurate extensometer of relatively simple form which will magnify the movement to be measured more than has been possible with present comparable measuring instruments. This is accomplished by the friction drive of a pointer shaft by means of engagement with a plurality, preferably three or more, arc-shaped members which receive their turning motion from the relative movement of two parts adapted to be secured to the specimen to be measured. These members support the pointer shaft in a way which eliminates lost motion and sliding friction.

A further object is to provide means associated with or forming a part of the arc-shaped members for placing the pointer shaft under pressure.

Other objects include the provision of means for limiting axial movement of the pointer shaft and means for preventing rotation other than about the longitudinal axis of said shaft.

Another important object is to provide auxiliary means for indicating the number of revolutions made by the pointer shaft during a given measurement.

It is also an object of the present invention to provide a compact instrument of the character indicated with an adjustable main scale, shock-absorbing means, and means for sealing the case enclosing the more delicate moving parts so as to accommodate the required movement of external measuring feet.

Other features contributing to ease of manufacture and accuracy in use will in part be obvious and will in part appear from the following detailed description of a preferred embodiment of the invention, taken in connection with the accompanying drawings, in which Fig. 1 is a front elevation to a greatly enlarged scale of the completed instrument, with certain parts broken away for purposes of illustration;

Fig. 2 shows a vertical section taken on the line 2—2 of Fig. 1;

Fig. 3 illustrates in perspective, to an enlarged scale the pointer shaft driving means;

Fig. 4 is an elevation showing the principles of the invention in diagrammatic form;

Fig. 5 is an elevation similar to Fig. 4, but with the elements in different relative positions;

Fig. 6 also is a similar diagrammatic elevation, but of a modified form of the invention; and Figs. 7, 8, 9, 10, 11, 12, and 13 show in elevation various forms of pivotal means which may be employed in the instrument of this invention.

In the drawings, Fig. 4 shows a simplified form of the invention designed to make clear the principles involved. The basic instrument consists of two main parts, 1 and 2, which can move relatively to each other in a substantially horizontal direction. In use as a dial gage one of the parts, say part 1 (which may form the case of the instrument), is held fixed, while the movement to be measured is transmitted to the other part, as by a pin 3, in a manner similar to the usual dial gage. In use as an extensometer the two parts 1 and 2 are attached to the two points on a specimen S between which the strain is to be measured, say by the sharp feet 4 and 5 integral with 1 and 2 respectively.

In either case the relative motion of parts 1 and 2 represents the movement or strain to be ascertained. Parts 1 and 2 are connected by three intermediate members or links 6, 7, and 8, each of which is hinged to parts 1 and 2, say by knife edges received in opposite notches as shown. These three links 6, 7, and 8, each carry an arm 9, 10, and 11, respectively, terminating in the respective circular arcs 12, 13, and 14. Between these arcs is a round cylinder or shaft 15, carrying a radial pointer 16. In every instance the center for the arc portion coincides or falls on the axis or point about which its arm or equivalent rotatable, elongated element oscillates. When projected into a common plane, the arc portions or the extensions of these arc portions must necessarily intersect each other because of the large ratio of their respective radiuses to the radius of the pointer shaft.

It will be evident that if parts 1 and 2 undergo a relative motion in the horizontal direction, as indicated in Fig. 5, the links 6, 7, and 8 together with their attached arcs 12, 13, and 14 will all rotate in the same direction. The motion of all three arcs is such as to spin or rotate shaft 15 between them. The rotation of the pointer 16, attached to 15, is readable on a circular scale 17 on part 1, as in the ordinary dial gage, and this reading gives a highly magnified measure of the relative motion of parts 1 and 2, representing the movement or strain to be determined.

It will be further noted that the shaft 15 with its pointer 16 floats between the arcs 12, 13, and 14, and requires no other bearings. In the form shown in Fig. 4 these arcs are struck about the upper pivot points or notches, connecting links 6, 7, and 8 to part 1, as centers. The center of shaft 15 will then be stationary with respect to part 1 and the scale for pointer 16 can be fixed to part 1 just as if the shaft 15 were mounted in bearings in part 1. If desired, the arcs could be struck about the lower pivot points or notches of links 6, 7, 8 as centers, in which case the center of shaft 15 would be stationary with respect to part 2 and the scale 17 could be attached to part 2.

In practice the device is assembled with a slight initial pressure between the shaft 15 and arcs 12, 13, and 14, so that there will be sufficient friction between their surfaces to give a positive drive to shaft 15, in the manner of friction gearing. Of course, after long use some creep between pointer shaft 15 and arcs 12, 13, and 14 must be expected, the effect of which can be corrected for by making the scale adjustable. This will not be of any importance in individual applications of the instrument. The proportions of said arcs and shaft will actually be such that shaft 15 can have a range of motion of several revolutions.

Unlike ordinary friction or toothed gear trains for magnifying motion, this invention eliminates all sliding friction, as well as all lost motion, at the high-speed end, that is in driving the shaft 15. The only resistance to driving shaft 15 would be the almost negligible air resistance, and rolling friction, which latter is very slight when hard surfaces are rolled together under small pressure.

In the construction illustrated, with good knife edges, sliding friction and lost motion can be eliminated at all points. However, the double knife edge construction of intermediate members or links 6, 7, and 8 is of itself not new, being used in many present extensometers, and is not an essential feature of the invention, alternative forms being described below. Probably the most valuable feature of the invention is that, while large angular motions are permitted, as with shafts mounted in bearings, sliding friction and lost motion are eliminated at the high-speed, indicating end, where such elimination is by far the most important.

The high speed moving part of the device, shaft 15 and pointer 16, is extremely simple, comprising a straight shaft and an attached pointer, and due to the features of positive centering through large angles of motion and the elimination of sliding friction, it can be made extremely small and light, thus making practicable a very high magnification. The device as shown in Fig. 4 has a double magnification, the first stage having a magnification equal to the radius of the arc 12 divided by the distance between the knife edges of link 6, while the second stage has a magnification equal to the radius of pointer 16 divided by the radius of the shaft 15. The complete form of the invention shown in Fig. 1 is designed to have a magnification in the first stage of about 10 and in the second stage of about 250, giving a total magnification of about 10×250, or 2500. This is about twice that of the most commonly used present, self-contained extensometer, and five to ten times that of the most sensitive available present dial gage. Measuring devices depending on rotating mirrors and electrical effects can be made very sensitive but are not self-contained like the present invention, and would be impractical to use in many applications.

Numerous other advantages over the above mentioned extensometer and dial gage can be cited. The extensometer mentioned has a range of movement of the pointer (without resetting, which has many disadvantages) of only 2 or 3 inches, while the device shown in Fig. 1, due to the possibility of the pointer turning through many revolutions, would have about ten times this range. Greater compactness, lightness, ruggedness, and much more parallel motion of the gage points (making it much more reliable because less sensitive to the method of attachment to the specimen) can also be obtained with this invention as embodied in Fig. 1. In comparison to the dial gage cited, the device of Fig. 1 has besides much greater magnification, a smaller operating force and an absence of small cyclic errors in the reading due to unavoidable slight inaccuracies in the shape of the teeth in the gear used.

Reference is now made to some further details of Fig. 4. To prevent parts 1 and 2 from accidentally separating in a vertical direction, vertical tension springs, such as 18 and 19, can be used to urge parts 1 and 2 together against links 6, 7, and 8. An alternative manner is disclosed in Fig. 1. Here parts 1 and 2 are connected by long vertical flexible ended links 20 and 21. By this parallelogram form of connection part 2 is constrained to a substantially horizontal motion relative to part 1. The intermediate links 6f, 7f, and 8f which will be further described subsequently, are hinged to part 1 as before, but they are connected to part 2 through flexible, horizontal cantilevers 22, 23, and 24 respectively. These flexible cantilevers are initially bent slightly upward and have to be sprung down when links 6f, 7f, and 8f are inserted, thus putting these parts under an initial compression which, due to the flexibility of the cantilevers, remains substantially constant throughout the range of relative motion of main parts 1 and 2.

To keep track of the number of complete revolutions of the pointer 16, a coarse reading scale, calibrated in such revolutions, can be provided by attaching a pointer 25 to one of the intermediate links, such as 7, so as to read on a scale 26 (Fig. 4).

All parts which might interfere with each other are of course placed in different planes. Thus arc portions 12, 13, and 14 in Figs. 4 and 5 can be placed in front of main parts 1 and 2, and pointer 16 in front of said arc portions. To keep the arc portions 12, 13, and 14 from interfering with each other, and at the same time prevent any rotation of shaft 15 except about its own longitudinal axis, several grooves can be cut in the faces of arc portions 12, 13, and 14, leaving a number of spaced parallel sectors or "teeth" which are intermeshed as shown in Fig. 3. In the form shown, arc portion 12 comprises a pair of teeth 27 spaced to mesh between three such teeth 28 on arc portion 13, and a pair of teeth 29 on arc portion 14.

Any accidental axial motion of shaft 15 is limited at each end by a pair of spaced stops 30 and 31, Figs. 2 and 3, made of glass or other hard substance. Shaft 15 is sharpened or rounded on each end, as shown, to eliminate appreciable resistance to rotation of the shaft if it comes into contact with either stop.

Some possible alternative forms of different parts of the device are shown in Figs. 6 to 13, and described in the following. The number of arc portions such as 12, 13, and 14 must be at least three to restrict sufficiently the motion of the shaft 15, but can be greater if desired. Three is the preferred number for simplicity. They need not necessarily be distributed at exactly equal angles around shaft 15. Moreover, they need not have the same radius of arc or distance between knife edges provided they have the same ratio between these dimensions, so all will give the same angular velocity to shaft 15 without sliding on it.

Only one of these arcs must necessarily be positively driven, as by the double knife edge device of links 6, 7, and 8. Thus in Fig. 6 the two lower intermediate members or links 6 and 8 are positively operated while an upper one, designated 10a, can rotate freely about the center of its arc by bending of a flexible supporting strip 32 of springy material. Or instead of this flexible strip 32 an ordinary pivot can be employed. The radius of this upper arc portion 10a can evidently have any value, and if a pivot is used said portion can take the form of a complete wheel or disc. A single central spring 18a is provided for resiliently holding main parts 1 and 2 in operative relation.

Several alternatives to the double knife edge form of links 6, 7, and 8 in Fig. 4 are shown in Figs. 8 to 13. Fig. 7 shows in more detail the double knife edge form of link 6, which is formed with knife edges 33 and 34 engaging notches 35 and 36 in parts 1 and 2, respectively. Fig. 8 shows a form in which ordinary pivots 37 and 38 are used instead of the knife edges for a link 6a. In Fig. 9 the intermediate member or link takes the form of a simple roller 6b held between horizontal flat surfaces in parts 1 and 2 and constrained only by friction with these surfaces to keep its position and rotate when main parts 1 and 2 move relatively to each other. In Fig. 10 is shown a similar roller 6c which is positively constrained to keep its position or to rotate by a pair of flexible strips 39 and 40 which are wrapped around it in opposite directions and fastened to the horizontal surfaces of parts 1 and 2 at 41, 41 and 42, 42, and to the roller at 43 and 44 as indicated. In Fig. 11 the member 6d is attached to part 1 by the flat, flexible spring strips 45 and 46, which plainly are the equivalent of a pivot at their point of intersection. The member 6d is similarly pivoted to part 2 by another pair of flexible strips 47 and 48 at right angles, as before. Strip 47 can be omitted when parallelogram links 20, 21 are used as in Fig. 1.

In Fig. 12 the member or link 6 takes the form of a 45° involute tooth pinion 6e which is constrained to roll between two racks 49 and 50 cut in parts 1 and 2. The pressure angle need not be exactly 45°, but should be near this to eliminate lost motion without having binding when the racks are forced together. For small relative motions of parts 1 and 2 it is evident that only the upper and lower vertically aligned teeth of the pinion 6e are needed, and this gives an additional link form 6f shown in Fig. 13. This form (6f) closely resembles that of Fig. 7, but it has the advantage that a truly linear relation between the angular velocity of link 6f and the relative motion of main parts 1 and 2 is obtained, which is not quite true with the link form of Fig. 7. Fig. 13 is therefore the preferred form, in spite of the fact that a little sliding friction (at the low speed end of the instrument) is introduced, and this is the form used in Fig. 1.

In Fig. 1, which represents a preferred form of an application of this invention, most of the parts have the same function and are numbered the same as in the diagrammatic figures. The coarse scale 26 is calibrated in revolutions of the main pointer 16. The main scale 17 can be rotated by the finger nail on its serrated edge 51, which projects slightly through the case, to correct for any gradual creep of the shaft 15 in its surrounding arc portions 12, 13, and 14. The shaft 15 is made from fine wire of suitable hardness and pointer 16 is a sliver of Balsa wood. The gage points or feet 4, 5 (the application shown is for an extensometer) are made in the form of detachable pins so that the gage length can be varied by inserting them in other holes shown dotted. Cushion parts 52 are soft artificial rubber inserts designed to increase the ruggedness of the instrument by cushioning the blow if the instrument should accidentally be dropped. They are located in such a way that if dropped on any flat surface they are practically sure to meet the surface first. They consist only of portions of rubber band which is stretched, inserted in undersize slots 53 at the four corners of the instrument case part 1 and allowed to expand into the slots and extend beyond the ends. In Fig. 1 a number of similar rivets or screws 54, 54 are indicated at properly distributed points for attaching a flat backed transparent front face 55 to the case part 1, and for amply stiffening that part. At this point it should be observed that the glass stop 30 is supported centrally in the flat back of the transparent face 55, as shown in Fig. 2, and that the opposite stop 31 for the shaft 15 is centrally attached to the inside of casing part 1 through the intermediary of a sponge rubber block 56. Further note is made that the main scale 17 is clamped between case part 1 and face 55 in such a manner that it can be zeroed by turning to the initial pointer position and will remain in the position to which set.

A hole 57 is made through part 1 for the insertion of a piece of stiff wire by means of which the instrument can be clamped to a specimen in a convenient manner. A similar hole 58 is disposed for use when an extension is clamped to the left side of the instrument to increase the gage length over the maximum possible without the extension. Very soft sponge rubber (artificial) inserts 59 and 59 are fitted between the lower adjacent portions of parts 1 and 2 to make the instrument case dust-proof.

In the complete instrument of Figs. 1 and 2 the link 7f and arm 10 component is made extremely flexible in the radial direction by the introduction of spaced thin flexible sections 60 and 61. Its radius of arc 13 is made initially slightly too large so that it has to be sprung into place, thus imposing a certain predetermined initial pressure between the shaft 15 and its surrounding arcs.

While the special features and advantages of the measuring instrument comprising the present invention have been elaborated in the preceding part of the specification, a brief summary of the mode of operation will now be given for convenience. When the extensometer of Fig. 1 has been attached to specimen S by means of a wire (not shown), passed through hole 57, the sharp feet 4 and 5 will securely engage the specimen at spaced points and relatively move the respectively attached main parts 1 and 2 according to the strain which is produced. The motion of parts 1 and 2, relative and horizontal, will swing links 6f, 7f, 8f and their attached arc members 12, 13 and 14, thus producing a rotation of shaft 15 and its pointer 16, reading on scale 17. Pointer 25 which is directly attached to arm 10 and therefore has a very low and opposite angular velocity as compared to pointer shaft 15 will indicate on scale 26 the number of revolutions made by the pointer 16.

Since the broad principles of this invention can obviously be embodied in many forms of mechanism other than disclosed herein, it is not intended that the invention should be limited to any specific construction and arrangement of parts, except as may be required by the spirit and scope of the appended claims.

Having thus described my invention, what I claim as new and desire to secure by Letters Patent of the United States is:

1. In a measuring device of the character described, a cylindrical shaft, pointer means carried by the shaft, at least three rotatable elements having adjacent arc portions intersecting each other when projected into a common plane and constructed and arranged to support and turn the shaft, and means for imparting rotational movement to one of the rotatable elements.

2. A device for measuring small distances, motions or strains, including in combination a round shaft, a pointer on the shaft, and lateral supporting means for the shaft comprising at least three rotatable elements having adjacent arc portions intersecting each other when projected into a common plane and, at least one of which acts as a driver to turn the shaft in the manner of friction gearing.

3. In a measuring instrument of the character described, a cylindrical shaft, a pointer secured to the shaft, a plurality of rotatable elements each having a circular arc portion adapted to support and turn the shaft, said arc portions being formed and arranged to intersect each other when projected into a common plane, means for resiliently holding the rotatable elements and the shaft in engagement, and means for imparting swinging movement to at least one of the rotatable elements.

4. In a measuring instrument of the character described, a cylindrical shaft, a pointer adapted to be actuated by the shaft, at least three rotatable elements having arc portions engaging, surrounding and laterally supporting said shaft for axial rotation, said arc portions being divided into spaced parallel sectors arranged to bear on the shaft at spaced points so as to prevent any rotation except about the axis of the shaft, and means for imparting rotational movement to at least one of the rotatable elements.

5. In a measuring instrument of the character described, a shaft having a cylindrical portion, a first pointer adapted to be actuated by rotation of the shaft, at least three rotatable elements having adjacent arc portions, intersecting each other when projected into a common plane, and laterally engaging and supporting the cylindrical portion of the shaft for axial rotation, means for imparting movement to at least one of the rotatable elements, and a second pointer secured to one of the rotatable elements for swinging movement therewith.

6. An instrument for measuring small distances, motions or strains, comprising, in combination, a pair of spaced, relatively movable main parts, a plurality of link members arranged intermediate the main parts and pivoted at opposite ends on each part, an arm fixed to each link member, each of said arms having a circular arc portion and said arms being arranged in converging relation with the arc portions adjacent each other, a shaft laterally supported by said arc portions for axial rotation in response to rotation of a link member, and pointer means adapted to be actuated by rotation of the shaft.

7. The combination of claim 6 in which the pair of main parts have oppositely disposed notches for receiving the link members and the ends of the link members cooperating with said notches have the shape of a gear tooth.

8. An instrument for measuring small distances, motions or strains, comprising, in combination, a pair of spaced main parts arranged for relative, parallel movement, three rotatable elements carried by said main parts, one of said rotatable elements being pivotally connected to both of the main parts, and each of said rotatable elements having a circular arc portion, with the arc portions arranged to intersect each other when projected into a common plane, a cylindrical shaft laterally supported by all of the arc portions of the rotatable elements for axial rotation in response to relative movement of the main parts, and corresponding movement of the rotatable element which is pivotally connected to both main parts, and pointer means operatively connected to the shaft.

9. An instrument for measuring small distances, motions or strains, comprising, in combination, a pair of spaced main parts arranged for relative, parallel movement, two rotatable elements each pivotally connected to both of the main parts, a third rotatable element pivoted to only one of said parts, each of said rotatable elements having a circular arc portion, with the arc portions arranged to intersect each other when projected into a common plane, a cylindrical shaft laterally supported by all of the arc portions of the rotatable elements for axial rotation in response to relative movement of the main parts and corresponding movement of the two rotatable elements which are pivotally connected thereto, and pointer means operatively connected to the shaft.

10. In a measuring instrument of the character described, a pair of spaced main parts arranged for relative parallel movement, flexible means connecting the main parts together at spaced points, a plurality of link members arranged at intervals intermediate the main parts and pivoted at opposite ends on each part, one of said parts being provided with flexible cantilevers formed and disposed for pivotal engagement with one end of each link member, an elongated rotatable element fixed to each link member, said elongated rotatable elements being arranged in converging relation, a cylindrical shaft laterally supported in rolling engagement by the rotatable elements for axial rotation thereby in response to pivoting of the link members when the main parts move relatively, and pointer means operatively connected to the shaft.

11. In a measuring instrument of the character described, a pair of spaced main parts arranged for relative parallel movement, means connecting the main parts together at spaced points, a plurality of link members arranged at intervals intermediate the main parts and pivoted at opposite ends on each part, a rotatable element fixed to each link member and having a circular arc portion, said rotatable elements being arranged in converging relation with the arc portions overlying each other and one of said rotatable elements having a flexible intermediate section to permit radial yielding, a cylindrical shaft laterally supported by the arc portions of the rotatable elements for axial rotation thereby in response to pivoting of the link members when the main parts move relatively, and pointer means operatively connected to the shaft.

12. In a measuring instrument of the character described, a pair of spaced main parts connected together for relative, parallel movement, one of said main parts partially surrounding the other and formed to provide a case for the instrument, a transparent face closing the case, a plurality of rotatable elements carried by said main parts and also within the closed case, one of said rotatable elements being pivotally connected to both of the main parts, and each of said rotatable elements having a circular arc portion, with the arc portions arranged to intersect each other when projected into a common plane, the rotatable element which is pivotally connected to both main parts being arranged to rotate the shaft in response to relative movement of those parts, and pointer means operatively connected to the shaft.

13. In a measuring instrument of the character described, a pair of spaced main parts connected together for relative parallel movement, one of said main parts partially surrounding the other and formed to provide a case for the instrument, a transparent face closing the case, a cylindrical shaft within the thus closed case, a plurality of converging rotatable, elongated elements having circular arcs on their ends adjacent each other laterally supporting the shaft for axial rotation, said rotatable elements being pivotally connected to both main parts and arranged to rotate the shaft in response to relative movement of those parts, and pointer means operatively connected to the shaft.

14. The combination of claim 13 in which the periphery of the case formed by one of the main parts is provided with notches at spaced points, and cushion members secured within said notches and projecting outwardly.

15. In a measuring instrument of the character described, a pair of spaced main parts connected together for relative parallel movement, one of said main parts partially surrounding the other and formed to provide a case for the instrument, a transparent face closing the case, a circular scale retained between the case and face for rotatable adjustment, a cylindrical shaft within the thus closed case, a plurality of rotatable elements having circular arcs on their ends formed and arranged to intersect each other when projected into a common plane and laterally supporting the shaft for axial rotation, said rotatable elements being pivotally connected to both main parts and arranged to rotate the shaft in response to relative movement of those parts, a pointer fixed to one of the rotatable elements, and pointer means operatively connected to the shaft.

16. As a subcombination, a measuring instrument of the character described comprising a pair of spaced main parts connected together for relative parallel movement, one of said main parts partially surrounding the other and formed to provide a case for the instrument, a face closing the case, and soft rubber blocks sealing the case adjacent its periphery between the main parts without interfering with their relative movement in operation.

17. In a measuring instrument of the character described, a cylindrical shaft, a pointer secured to the shaft adjacent one end, a plurality of adjacent rotatable elements formed to have rolling engagement with the periphery of the shaft and adapted to support and turn the same, means for imparting swinging movement to one or more of the rotatable elements, and a hard stop at each end of the cylindrical shaft for preventing longitudinal displacement.

18. In a measuring instrument of the character described, a round shaft with pointed ends, a pointer operatively connected to the shaft, a plurality of rotatable elements formed to have rolling engagement with the periphery of the shaft and adapted to laterally support and turn the same, means for imparting swinging movement to one or more of the rotatable elements, and a hard stop adjacent each pointed end of the shaft for preventing longitudinal displacement, one of said stops being yieldingly supported.

LLOYD H. DONNELL.